United States Patent [19]

Blanchette

[11] 4,291,891
[45] Sep. 29, 1981

[54] CONVERTIBLE SLED

[76] Inventor: Claude Blanchette, 6550 Sherbrooke West, Apt. 1808, Montreal, Canada, H4B 1N6

[21] Appl. No.: 131,203

[22] Filed: May 2, 1980

[51] Int. Cl.³ .............................................. B62B 13/18
[52] U.S. Cl. ......................................... 280/9; 280/24; 280/43.22; 280/43.24; 280/13
[58] Field of Search ................... 280/8, 9, 13, 7.12, 280/24, 87.01, 43.14, 43.22, 43.24

[56] References Cited

U.S. PATENT DOCUMENTS

| | | | |
|---|---|---|---|
| 466,573 | 1/1892 | Platto | 280/43.14 |
| 649,177 | 5/1900 | Regli | 280/9 |
| 2,783,055 | 2/1957 | Michaud | 280/43.14 |
| 3,443,286 | 5/1969 | Groce | 280/43.14 |
| 3,730,542 | 5/1973 | Chadwick | 280/9 |

FOREIGN PATENT DOCUMENTS

| | | |
|---|---|---|
| 125204 | 5/1909 | Canada . |
| 158487 | 6/1913 | Canada . |
| 164958 | 9/1915 | Canada . |
| 182697 | 3/1918 | Canada . |
| 871595 | 5/1971 | Canada . |

Primary Examiner—Joseph F. Peters, Jr.
Assistant Examiner—D. W. Underwood

[57] ABSTRACT

A convertible sled is disclosed for use on snow as well as surfaces devoid of snow. The sled comprises a pair of runners rigidly secured to the underside of the sled and three pivotal wheels. The first, front wheel is secured to a rotatable rod extending longitudinally and centrally under the front portion sled. Linkage means connects this rod to two other rods each longitudinally rotatably disposed adjacent one of the runners. An operating lever easily accessible at the front of the sled and secured to the first named rod serves to pivot all three wheels between a first ground-engaging position with the runners off the ground, and a second inoperative retracted position relative to the runners.

5 Claims, 7 Drawing Figures

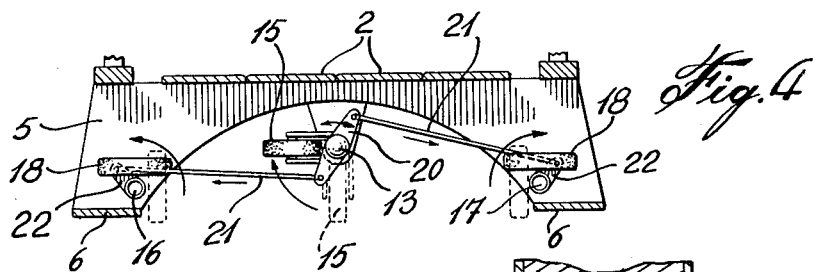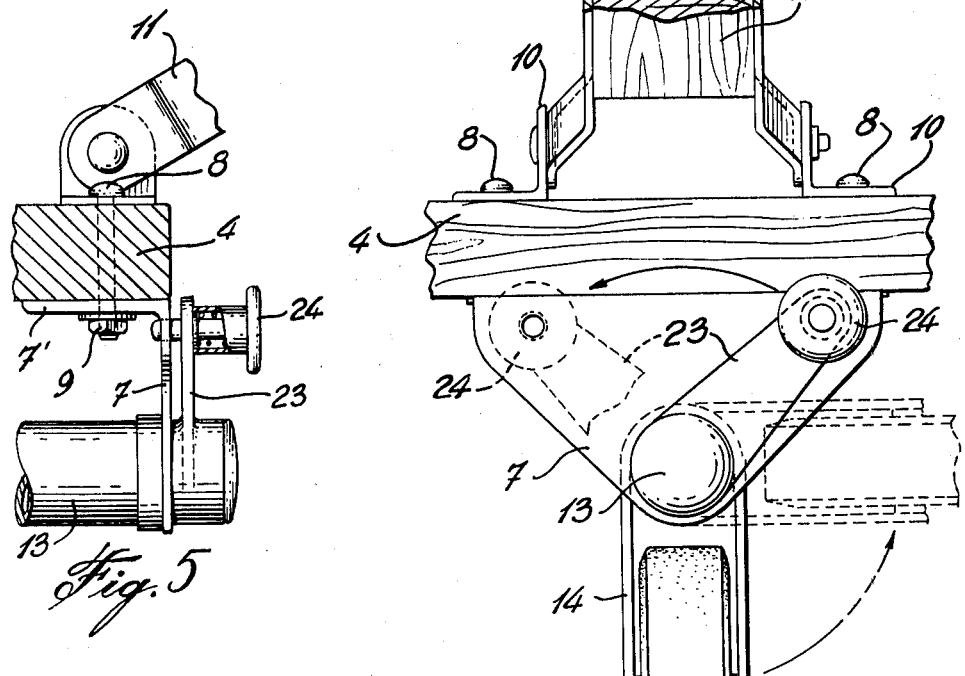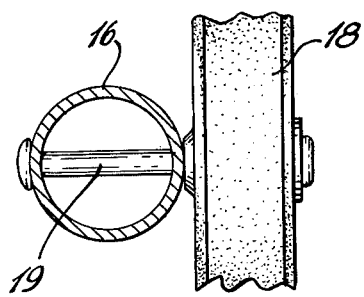

CONVERTIBLE SLED

FIELD OF THE INVENTION

The present invention relates to sleds, more specifically to a sled which may be converted to a child's wagon.

BACKGROUND OF THE INVENTION

This invention provides a known sled having runners with wheels which may be lowered into a ground-engaging position. Other such convertible sleds have been proposed in the prior art: for example Canadian Pat. No. 871,595 proposes a sled vehicle which may be used alternatively as a sled on wheelbarrow and "rocker". However, the sled of this patent must be turned upside down to accomplish the transition, something which is cumbersome since the occupant, normally a small child, must be taken off the vehicle. Another Canadian Pat. No. 164,953 discloses a sleigh provided with wheels which are operated by independent levers which take up space as clearly seen in FIG. 1 of the patent. Other Canadian Pat. Nos. (182,697 and 125,204) teach devices which make use of breakable components such as springs and are directed to a different purpose than that of the present invention, respectively.

OBJECTS OF THE INVENTION

It is a first object of the invention herein disclosed to provide a sled which is adapted to be used in all seasons, whether there is snow on the ground or not, particularly in the late fall and early spring when roads and sidewalks are partially devoid of snow.

It is another object of the present invention to provide a sled which is simple in design and inexpensive to manufacture.

SUMMARY OF THE INVENTION

The above and other objects of the invention are realized in accordance with a preferred embodiment comprising a passenger seat having a seat surface. Two laterally spaced-apart runners are rigidly secured to the lower ends of a pair of longitudinally spaced-apart supports in turn rigidly secured to the underside of the seat surface of the sled.

The latter is adapted to roll on at least three wheels should there be no snow on the ground. Two of the wheels are rearwardly located each being rotatably secured to an associated rod extending alongside the corresponding runner. The third wheel is frontwardly and centrally located, being rotatively attached to a third rod extending between the front of the sled and the frontmost support. Linkage means are provided between the third rod and the two other rods whereby the three wheels may be transversely swung between a first ground-engaging position wherein they are vertically oriented and extend slightly below the plane defined by the runners and a second inoperative position wherein they are substantially horizontal and above the runners.

The above will be more clearly understood by referring to the preferred embodiment of the invention, illustrated by way of the accompanying drawings, in which:

BRIEF DESCRIPTION OF THE DRAWINGS

FIG. 4 is same view as that of FIG. 3 showing how the wheels are pivoted to inoperative position;

FIG. 5 is a side elevation of the operating lever and associated elements;

FIG. 6 is a front view of the operating lever and front wheel and, in dashed outline, the lever and front wheel swung to inoperative position, and FIG. 7 is a cross-sectional view of one of the rear wheels (broken away) and its connection means to the associated rod.

Like numerals refer to like elements throughout the drawings.

DETAILED DESCRIPTION OF THE INVENTION

Figure 1:
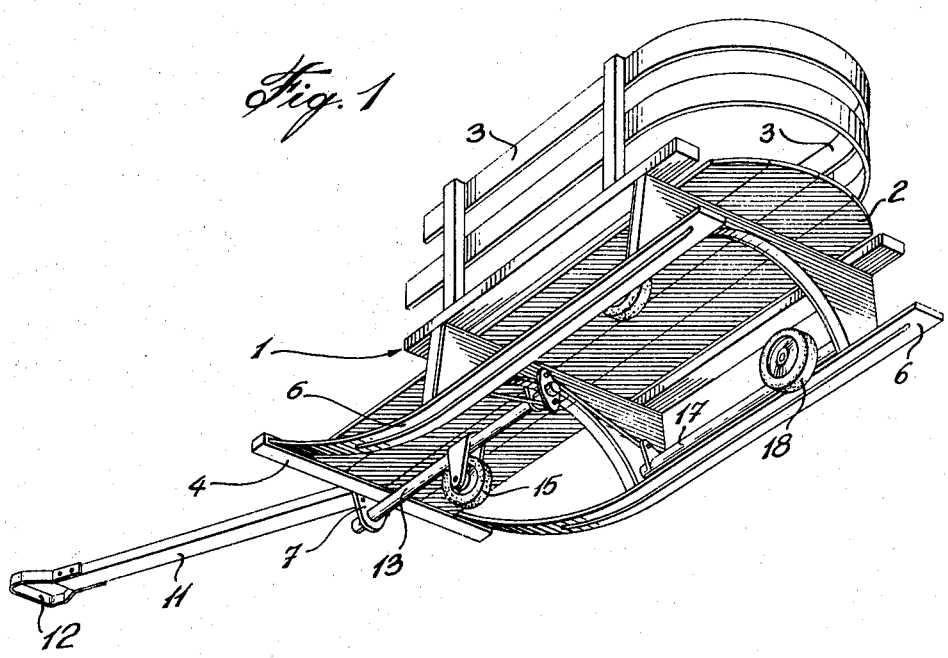
FIG. 1 is a perspective view of the sled with the wheels in operative position.

The invention comprises a sled 1 having a passenger compartment formed by a generally flat seat surface 2 and upstanding sides 3. The seat surface 2 extends frontwardly of the upstanding sides 3 and terminates in a transverse beam 4.

Two longitudinally spaced-apart arch-shaped supports 5 are rigidly secured to the underside of seat surface 2. A pair of runners 6 are in turn rigidly secured to the lower ends of supports 5. The front ends of runners 6 are upwardly curved and joined to the transverse beam 4.

The latter has bolted thereto a vertically and downwardly extending plate 7 which has an upper horizontal portion 7'. Bolts 8 and their associated nuts 9 secure plate 7 to the beam 4. Bolts 8 also secure a pair of spaced-apart orthogonal flanges 10. A frontwardly projecting pull-handle 11 has its lower end pivotally secured to flanges 10 as seen clearly in FIG. 6; the front end of pull-handle 11 is provided with a handle 12 for pulling the sled. Elements 1 to 12 except plate 7, 7' constitute a sled of conventional construction.

Figure 2:
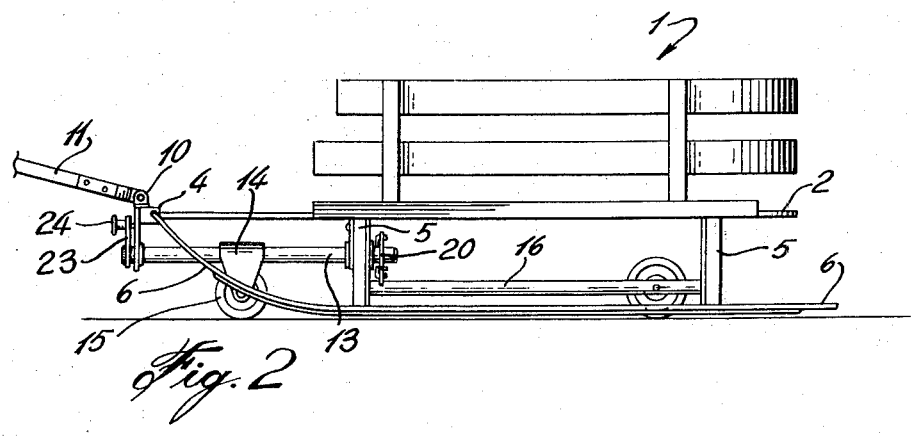
FIG. 2 is a lateral elevation of the sled also showing the wheels in operative position.
Figure 3:
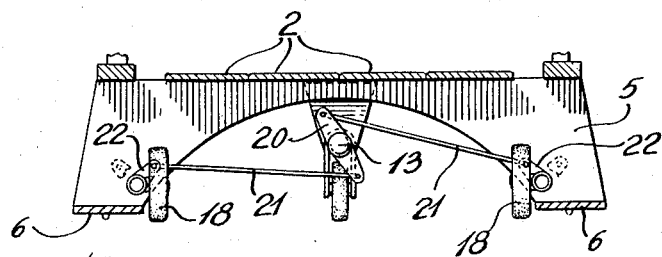
FIG. 3 is a rear end view of the back support showing the linkage means of the three wheels which are in operative position.

Plate 7 is formed with a hole through which extends and is journalled a centrally and longitudinally located first rod 13 (preferably tubular for lightness). As shown clearly in FIG. 2, rod 13 extends frontwardly beyond plate 7 for a short distance and passes, at its rear end, through a hole provided therefor in the front support 5, extending rearwardly of the latter.

Intermediate the front and rear ends of rod 13, a U-shaped bracket 14 is rigidly mounted thereto with its ends directed downwardly. A wheel 15 is rotatably secured on an axle between the two flanges of bracket 14 such that the lower surface of wheel 15 extends slightly below the plane defined by the runners 6 when the former is in operative position.

A second rod 16 and third rod 17 are pivotally secured to the respective sides of supports 5 slightly above each runner 6. Rods 16 and 17 are longitudinally oriented and are also preferably tubular.

Adjacent the rear support 5, both rods 16 and 17 rotatively carry a wheel 18. Wheels 18 are located inwardly of their respective rods and are each held in place by a transverse pin 19 (shown in FIG. 7). Wheels 18 are located at a certain distance forwardly of the rear ends of runners 6.

The operating mechanism for the three wheels consists of the following: immediately rearward of the front support 5, a radially and orthogonally disposed pivot member 20 is rigidly secured to the first rod 13. This pivot member 20 has two diametrically opposed arms. The outer ends of these arms each pivotally retain one end of a straight rigid link 21. The other end of each link 21 is in turn pivotally secured to a corresponding short arm 22 secured to and projecting orthogonally from the front portion of rods 16 and 17.

The forward end of rod 13 is provided with a rigidly secured orthogonally projecting operating lever 23. The upper end of the latter has a spring-biased locking plunger 24 adapted to removably engage either one of two holes 25 arranged on an arc coaxial with rod 13 and spaced apart 90°.

It will be readily understood how the wheels are pivoted to operative or inoperative position as desired. As clearly shown in FIG. 6, the plunger is manipulated to rotate and lock rod 13 through an arc of 90 degrees. In the solid line position of plunger 24 shown in FIG. 6, all three wheels are in operative position, extending slightly below the plane defined by the runners 6 and with the two rear wheels located inwardly of the runners. Moving plunger 24 in a counter-clockwise direction, as indicated by the arrow in FIG. 6, causes all three wheels 15 and 18 to pivot upwardly into a substantially horizontal inoperative position with the two rear wheels located above runners 6: the front wheel 15 pivots because it is rigidly, integrally secured to the first rod 13, and the two rear wheels 18 also pivot as a result of the action on rods 16 and 17 of pivot member 20 and links 21. It is to be noted that the switch from runners to wheels or vice-versa is accomplished by simply lifting the sled 1 by its handles 12 with one hand, so that it rests upon the rear portions of runners 6 and pulling and moving plunger 24 with the other hand. Therefore, the sled passenger, normally a child, may stay put during the operation.

I claim:

1. A convertible sled comprising an elongated seat; two longitudinally spaced-apart supports rigidly secured to the underside of said seat; a pair of laterally spaced-apart runners rigidly secured in turn to the lower portions of said supports; a plate extending vertically and downwardly from the front of said seat; a first rod extending through and journalled in a hole provided therefor in said plate at its front end and also extending through and journalled in another hole provided therefor in the frontmost support at its rear end; a second and a third rod each rotatably secured at either end to the lower portion of said supports on either side of said sled adjacent said runners, said three rods extending longitudinally of said seat; further comprising a front wheel carried by the said first rod and a pair of rear wheels carried by the corresponding second and third rod respectively; each wheel rotatable about its axis, the latter being transverse to the long axis of the associated rod, a linkage means operatively connecting said first rod to said second and third rods whereby rotation of said first rod causes rotation of said second and third rods through an equal angle; an operating lever integrally attached to the frontmost portion of said first rod; whereby said operating lever can be moved from a first operative position wherein said three wheels are vertically oriented and in contact with the surface over which the sled is travelling, extending slightly below the plane defined by said runners, and a second inoperative position wherein said three wheels are horizontally oriented and retracted upwardly from the plane defined by said runners.

2. A convertible sled as defined in claim 1, wherein the front of the sled is provided with a pull-handle and said rear wheels are located at a distance forwardly from the rear ends of said runners.

3. A convertible sled as defined in claim 1, wherein said linkage means comprises a pivot member rigidly secured to the rear end of said first rod, said pivot member having two diametrically opposed and orthogonally projecting first arms, a radial second arm secured to each of said second and third rods, and a pair of rigid links respectively pivotally interconnecting the outer ends of a first and of a second arm.

4. A convertible sled as defined in claim 1 or 2, further including means to removably lock said operating lever in either one of its two positions.

5. A convertible sled as defined in claim 1 or 2, further including a spring biased locking plunger carried by the outer end of said operating lever and removably engageable into either one of two holes made in said plate and associated with the two positions of said operating lever.

* * * * *